United States Patent [19]
Simonson et al.

[11] Patent Number: 5,390,480
[45] Date of Patent: Feb. 21, 1995

[54] MULCHING DECK SPILLGATE

[75] Inventors: Daryl L. Simonson, Sheboygan; David P. Boebel, Waukesha, both of Wis.

[73] Assignee: Garden Way Incorporated, Troy, N.Y.

[21] Appl. No.: 122,923

[22] Filed: Sep. 17, 1993

[51] Int. Cl.⁶ ............................................. A01D 34/66
[52] U.S. Cl. ................................. 56/320.2; 56/13.6; 56/DIG. 22
[58] Field of Search ............... 56/6, 7, 11.1, 12.9, 56/12.8, 13.1, 13.2, 13.3, 13.4, 16.6, 16.9, 17.5, 255, 295, 320.1, 320.2, DIG. 17, DIG. 20

[56] References Cited

U.S. PATENT DOCUMENTS

| | | | |
|---|---|---|---|
| 4,856,265 | 8/1989 | Wolf | 56/320.2 |
| 4,916,887 | 4/1990 | Mullet et al. | 56/13.8 |
| 5,129,217 | 7/1992 | Loehr | 56/13.6 |
| 5,191,756 | 3/1993 | Kuhn | 56/17.5 |
| 5,214,906 | 6/1993 | Saki et al. | 56/320.2 |

Primary Examiner—Ramon S. Britts
Assistant Examiner—Pamela O'Connor
Attorney, Agent, or Firm—Schmeiser, Olsen & Watts

[57] ABSTRACT

A rotary lawn mower accommodating plural blades supported for rotation in a housing having two generally cup-shaped compartments, the side walls of each compartment merging along a common wall portion so as to form a continuous downwardly extending housing skirt with a lower rim, the trailing edge of the housing in normal direction of movement extending rearwardly and outwardly to provide an exit spillgate, the spillgate having top and rear ground facing sides and edges to provide an extended spillgate for distributing grass clippings, the rear facing edge of the spillgate and the side edges being outwardly and downwardly sloped in the preferred embodiment to enhance distribution of grass and other material ingested in the lawn mower.

10 Claims, 3 Drawing Sheets

MULCHING DECK SPILLGATE

FIELD OF THE INVENTION

This invention relates generally to the structure of lawn mower housings and to such housing constructions for discharge of grass clippings and is particularly directed to an improved lawn mower blade housing having a structure which enhances even distribution of grass clippings.

BACKGROUND OF THE INVENTION

With the increasing need for mulching mowers which reduce grass clippings to a small particle size thereby permitting grass clippings to remain on and below the mowed grass without being bagged or otherwise disposed of, many types of lawn mowers having unique blade configurations have been developed. The housings within which such blades are used present a variety of problems, which problems are significantly increased when it is desired to use a plural blade lawn mower to produce a larger cutting width. The distribution of clippings from such a plural blade mulching mower presents problems whether or not those lawn mowers are of the riding type, walk behind, or tractor type. Most mulching mowers operate with one or more blades which endeavor to elevate and recut the grass clippings thereby creating smaller particles which can be distributed in the remaining "growing" grass without creating wind rows, clumps, or other difficulties and returning valuable nutrients to the soil.

OBJECTS OF THE INVENTION

It is a principle object of this invention to provide a housing for spaced multiple blade grass cutting apparatus providing improved grass clipping distribution.

It is a further object of this invention to provide a power driven lawn mower having at least two blades rotating in a substantially horizontal plane about spaced driven vertical shafts, the mower being suitable for user walk behind operation with improved grass clipping distribution and containment of most foreign materials ingested by the lawn mower.

It is an additional object of this invention to provide a walk behind, power driven lawn mower having at least two rotating mulching blades bout vertical axes in the housing, which housing has a rear spillgate to effect improved glass clipping distribution.

It is a still further object of the invention to provide a housing for spaced multiple blade grass cutting apparatus having a rearwardly extending downwardly facing spillgate to effect the improved grass distribution.

Other objects will be in part obvious and in part pointed out more in detail hereinafter.

A better understanding of this invention will be obtained from the following detailed description and accompanying drawings of illustrative applications of the invention.

SUMMARY OF THE INVENTION

A lawn mower housing is provided with two compartments to accommodate two rotating blades, the general shape of the compartments being inverted cup-shaped with cup side walls interrupted along a common chordal merger line to form a generally FIG. 8 configuration when viewed from the housing bottom. A cutting blade is supported in each compartment and the trailing edge housing portion extending from the merged area is constructed to extend rearwardly and outwardly to provide a rear projection having a top and side and rear ground-facing edges. The side and rear edges of the projection or spillgate are outwardly and downwardly sloped to provide improved distribution of grass cuttings and other materials ingested by the mower.

THE DRAWINGS

DESCRIPTION OF A PREFERRED EMBODIMENT

Figure 1:
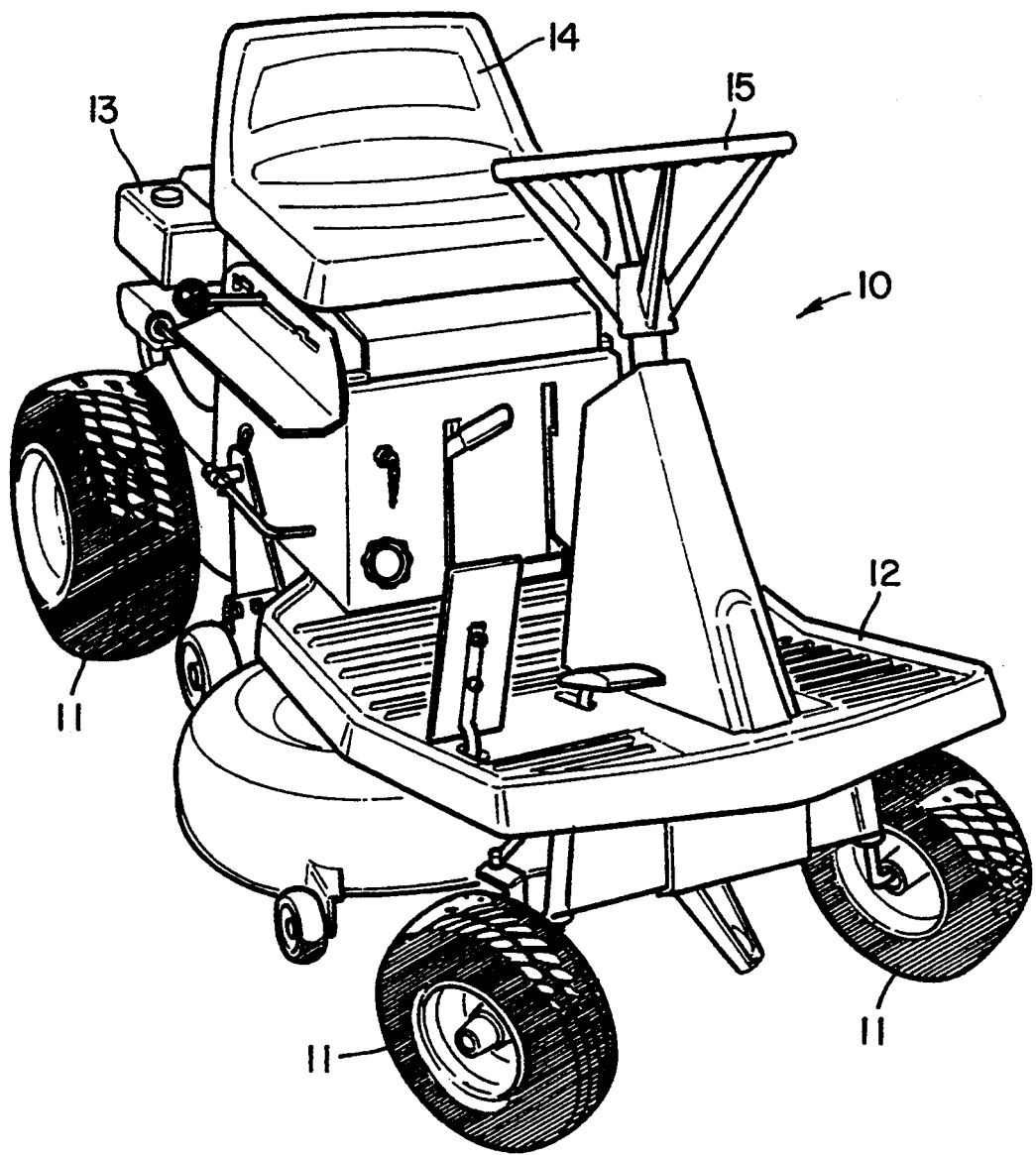
FIG. 1 is a perspective view of a power driven riding lawn mower showing the typical environment of use of the present invention.

Turning first to FIG. 1, it is seen that a typical rear engine, riding lawn mower generally identified by the numeral 10, has wheels 11, supporting a frame 12 on which is located a rear mounted engine 13, (partially shown) a seat 14, and a suitably supported steering wheel 15 for controlling the movement of the front wheels 11. In addition there are brake pedals, gear shifts, etc., all of which are environmental structure, well known in the prior art in which the present invention can be utilized.

Figure 2:
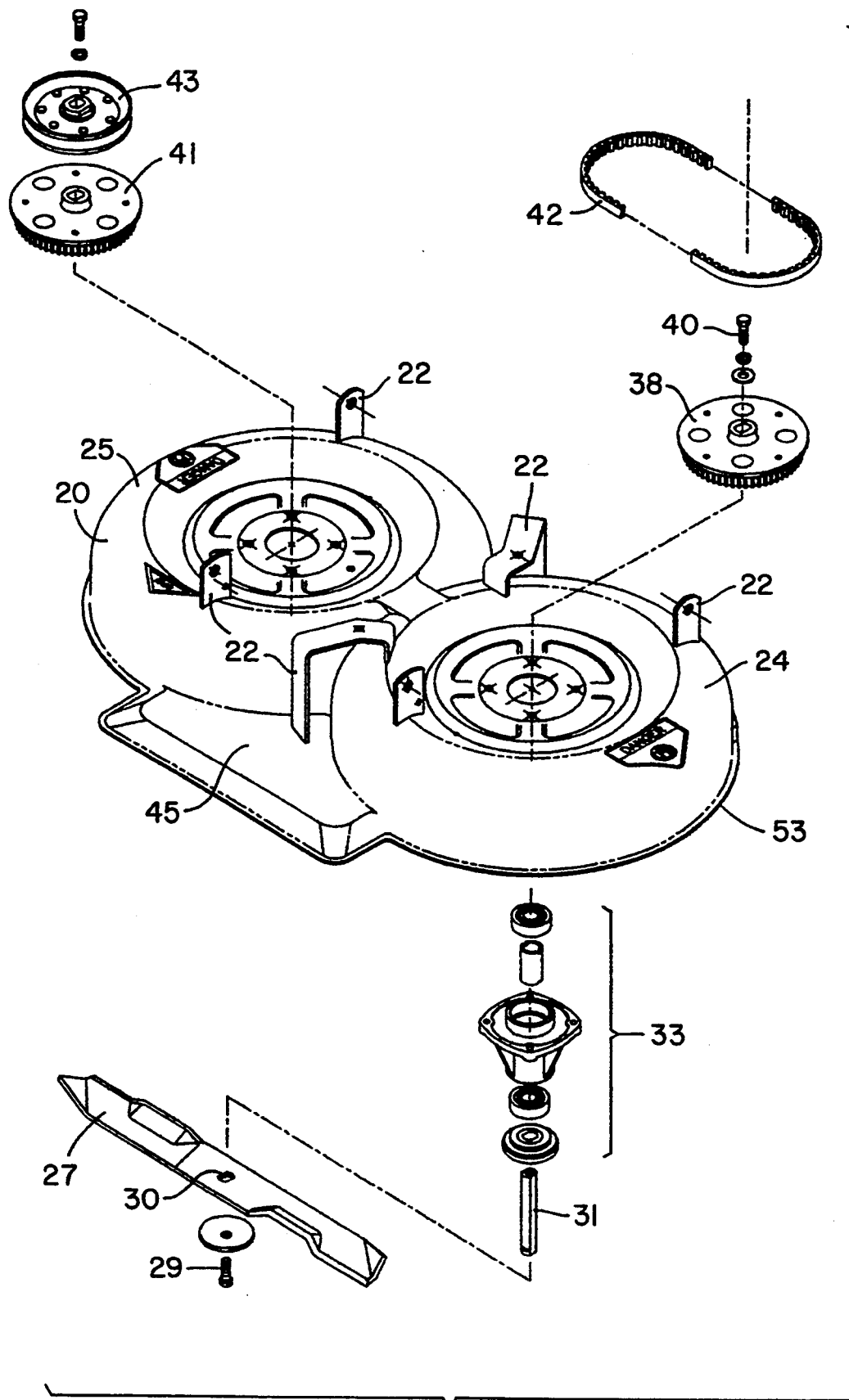
FIG. 2 is an exploded perspective view of a two blade housing illustrating a preferred embodiment of the invention and illustrating a typical blade drive mechanism.

FIG. 2 illustrates a housing or deck generally designated 20, having suitable support members 22, for attachment to the frame of a mower such as that of FIG. 1. There are two compartments in housing 20 generally designated 24 and 25. Housing 20 is typically fabricated from stamped and welded sheet metal but any suitable technique for construction such as casting is acceptable.

Each compartment 24, 25 supports a lawn cutting blade 27, (only one of which is shown in FIG. 2) which blade 27 is suitably secured by fastener 29 extending through blade aperture 30 to engage spindle 31. The support structure generally bracketed by the numeral 33 includes bearings, a mounting collar, and suitable fasteners extending through the housing, to securely affix and position a blade 27 within each housing compartment for rotary motion. The drive to each blade is provided by a toothed drive pulley or member 38, which is secured to shaft 31, by fastener 40. The same drive and blade mounting structure exists for compartment 25 and toothed drive pulley 41 is drivingly connected with pulley 38, by timing belt drive member 42. Additionally there is provided a pulley 43, which is secured to toothed drive pulley 41, which pulley 43 can be a standard V-belt pulley for connection to the engine and controls (not shown). For completeness in the description of FIG. 2, it is observed that a spillgate generally designated 45, is illustrated and is hereinafter described in greater detail.

By way of general information, the present mower deck is intended for principal usage in connection with so-called mulching blades such as partially shown in FIG. 2. When the grass is cut, the shape of the blade causes the clippings to experience an upward flow of air to be recut into smaller and smaller pieces in accordance with known mulching blade and housing technology. It is customary with such mulching blades to provide a somewhat dome shaped housing which assists in the requisite upward air flow as the clippings are cut and recut and such a dome shaped housing is also common in the prior art.

Figure 3:
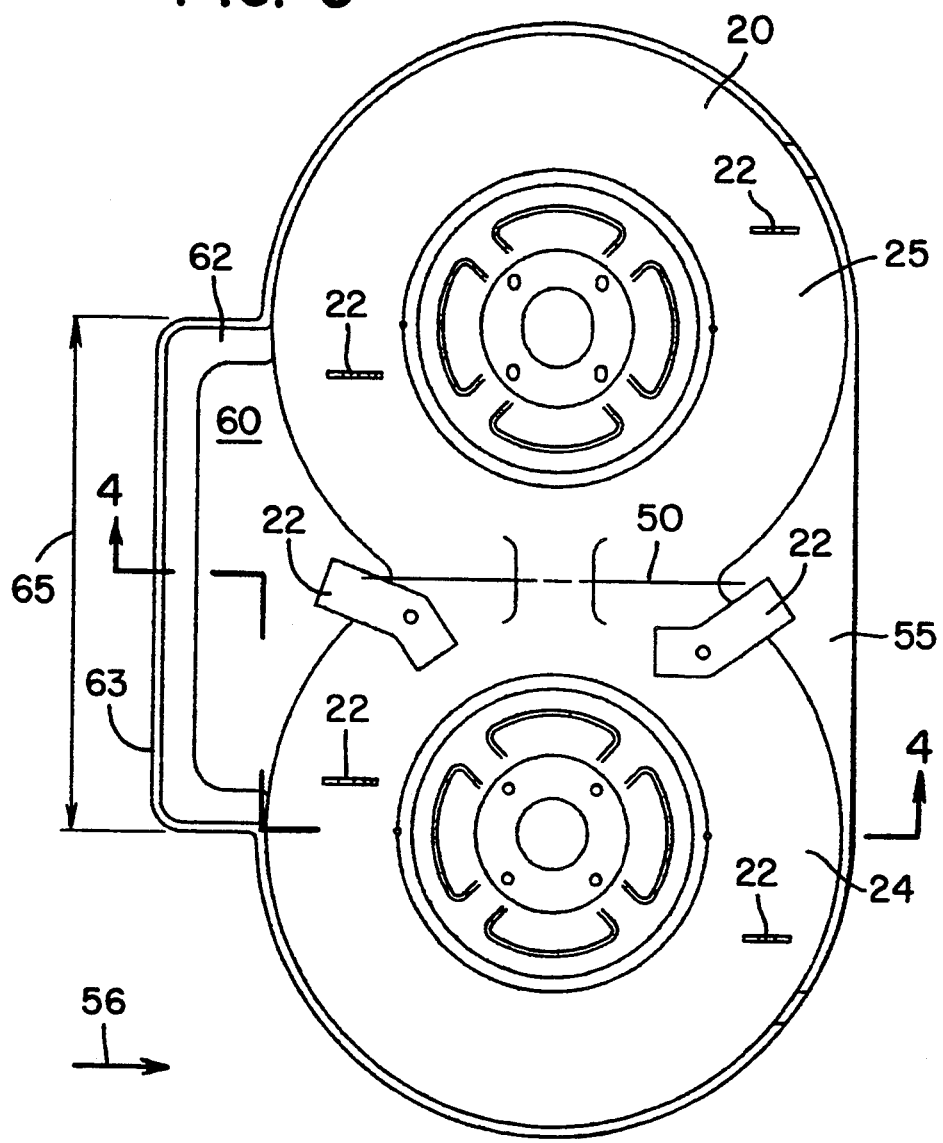
FIG. 3 is a top plan view of a preferred embodiment of the housing.
Figure 4:
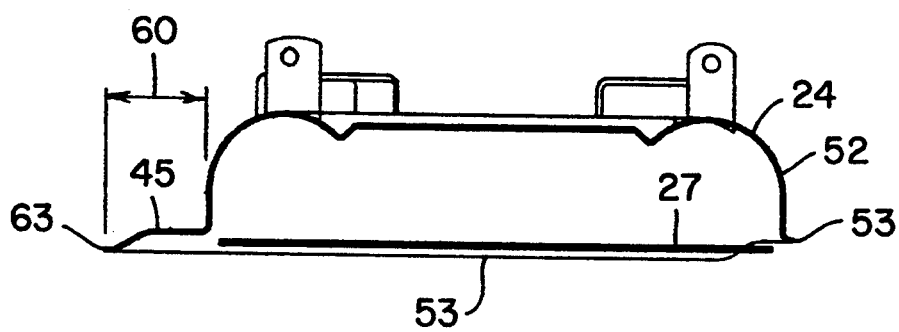
FIG. 4 is a cross section view taken generally along the lines 4–4 of FIG. 3 and showing a schematic side view of a blade.

Considering FIGS. 3 and 4 together, it is noted that the housing 20 has a general "FIG. 8" shape and, as best seen in FIG. 4, is comprised of two inverted cup-shaped compartments 24 and 25, which overlap each other so as to merge their top and side walls together along a chord line 50, such that with appropriate weldments, the two compartments are secured together as a unitary housing structure 20. Such inverted generally cup-shaped compartments having side walls which merge along one portion of each cup to form a downwardly extending continuous housing skirt 52 having a lower rim extending about the housing which rim is generally designated 53.

A front web 55 provides a leading edge of movement and a rear spillgate 63 provides a trailing edge of movement. The front web 55 interconnects the open space between the compartments in the forward portion of the housing as determined by the direction of travel arrow 56. It is pointed out (as best seen in FIG. 4) that the front portion of rim 53 ends above the basic height of the plane of rotation of cutting blade 27 thereby to facilitate entry of grass into the two compartments to be cut.

In accordance with a primary feature of the present invention, there is provided a spillgate generally designated 45 which is formed by a web that interconnects open space between the rear walls (in the direction of travel) of the two inverted cup-shaped compartments and includes a generally flat roof portion 60, a pair of side wall portions 62, and a rear portion 63, all of the portions of the spillgate terminate in the downwardly facing rim 53. Rear spillgate portion 63 and side spillgate portions 62 extend downwardly and outwardly from roof 60 and, as seen in FIG. 4, rim 53 of the skin or spillgate (and a portion of the compartment sidewalls, as well) extend below the general plane of rotation of the blade 27. Hence, as the mower of FIG. 1 moves forward, the grass clippings are discharged through the spillgate and directed toward the ground. Because of the timing belt drive described in connection with FIG. 2, the blades in each compartment rotate in the same direction to cut and recut grass clippings in each compartment for discharge through spillgate. By providing a spillgate extending beyond the blade compartments in the rearwardly facing direction and by providing downwardly and outwardly tapering walls having their lower edges below the plane of rotation of each blade, the clippings and other materials such as leaves, etc., that are ingested into the lawn mower cutting compartments are distributed in a surprisingly even manner so as to bring the benefits of mulching mowing to a plural compartment tractor type or walk behind mower. This development is particularly useful in so called wide-cut mowers which endeavor to use plural blades in compartments rather than a single large rotary blade and by providing the spillgate structure for a conventional two bladed FIG. 8 compartment, significant improvement is obtained in the distribution of grass clippings thereby to substantially eliminate the need for clipping, bagging and the like for riding and walk behind mowers.

In the preferred embodiment of this invention, it has been found that significant improvement of performance is achieved when the length indicated at FIG. 4 (numeral 60) is between 12% and 15% of the length of one of the cutting blades 27. The width of the spillgate at 65 of FIG. 3 has been found to be particularly effective if it is approximately 90% of the length of one mower blade, and of course, positioned at the rear center of the housing.

Although this invention has been illustrated and described with respect to exemplary embodiments thereof, it should be understood by those skilled in the art that various changes, omissions and additions may be made without departing from the spirit and scope of the invention.

We claim:

1. A rotary lawn mower comprising:
    a housing accommodating two cutting blades for rotation about spaced vertical axes;
    said housing having a pair of interconnected, inverted generally cup-shaped compartments, the sidewall of each cup-shaped compartment being merged along a portion of one wall portion of each cup to form a continuous downwardly extending housing skirt having a lower rim;
    said housing being supported for movement over a ground surface such that rotation of the cutting blades will cut grass at a given height;
    said housing having leading and trailing edges of movement;
    the trailing edge portion of one merged skirt of the housing compartments being rearwardly and outwardly extended to provide an exit spillgate for grass clippings;
    said spillgate having a top and rear ground facing edge being substantially coplanar with the major portion of the lower rim of each compartment of the housing in other than the merged portion;
    each of the two cutting blades being supported in a substantially separate compartment in said housing; and
    means rotatably driving the blades in a time controlled relationship to each other, each blade being of a length such that the circumference of circle of rotation described by one of the blade tips overlaps the other circumference of a circle of rotation of the other of the blade tips in the region of the merged wall portions with relative rotational blade drive timing such as to avoid interference of the blade ends.

2. The rotary lawn mower of claim 1 wherein the spillgate has ground facing side edges which are coplanar with the rear ground facing edge of the spillgate and are outwardly sloped.

3. The lawn mower of claim 2 wherein the two cutting blades rotate in the same direction and in a common plane.

4. The lawn mower of claim 3 wherein the rear ground facing edge of said spillgate includes a rear facing edge that is outwardly sloped.

5. The lawn mower of claim 4 wherein the rear facing wall and the two side walls of the spillgate are positioned at an angle of approximately 20° to 40° degrees measured relative to the ground thereby to deflect and distribute grass clippings and other objects ingested by the lawn mower toward the ground.

6. The lawn mower of claim 1 wherein the length of the spillgate from the merged portion of the compartments to the rear facing spillgate edge has a length approximately 8 to 15 percent of the length of one cutting blade.

7. The lawn mower of claim 6 wherein the width of the spillgate extending between blade compartments is approximately 90 percent of the length of one mower blade and substantially fills the area between the trailing edge of the overlapped housing compartments.

8. The lawn mower of claim 1 wherein the leading edge of said housing is a web extending between the leading edge of the overlapped compartments, the rim of the downwardly facing portion of said web being of a length terminating above the plane of blade rotation thereby to facilitate entry of grass to be cut, the web extending along a line that is substantially tangent to the leading edge of each compartment.

9. The lawn mower of claim 1 wherein the major plane of a top surface of the spillgate is generally flat and positioned above the plane of the blade rotation.

10. The lawn mower of claim 1 wherein the merger of the two compartments occurs along a chordal line of each compartment.

* * * * *